United States Patent [19]

Martin

[11] Patent Number: 4,822,322

[45] Date of Patent: Apr. 18, 1989

[54] TENSIONING DEVICE FOR TIMING BELT OR CHAIN IN AUTOMOTIVE ENGINE APPLICATIONS

[75] Inventor: Kelly D. Martin, Lawndale, N.C.

[73] Assignee: INA Bearing Co., Inc., Fort Mill, S.C.

[21] Appl. No.: 223,362

[22] Filed: Jul. 25, 1988

[51] Int. Cl.[4] .............................................. F16H 7/12
[52] U.S. Cl. .................................................... 474/135
[58] Field of Search ............... 474/101, 109, 111, 117, 474/113–115, 118, 133, 135

[56] References Cited

U.S. PATENT DOCUMENTS

| | | | |
|---|---|---|---|
| 4,392,840 | 7/1983 | Radocaj | 474/117 X |
| 4,473,362 | 9/1984 | Thomey et al. | 474/135 |
| 4,583,962 | 4/1986 | Bytzek et al. | 474/135 X |
| 4,634,407 | 1/1987 | Holtz | 474/112 |

Primary Examiner—Thuy M. Bui
Attorney, Agent, or Firm—Wigman & Cohen

[57] ABSTRACT

Apparatus for maintaining a predetermined optimum tension on an endless power transmission member, including a first cylindrical housing including a radially extending arm member, a pulley member carried by an arm member at the end thereof remote from the first housing, a pivot member for first housing, pivot member defining a pivot axis, and including a second cylindrical housing and one-way clutch member permitting pivoting of second housing in one direction only, second housing being disposed within first housing. Members coupled between the pivot member and first housing are included for rotatably driving said first housing about said pivot member in a first direction to move pulley member into tensioning engagement with endless power transmission member. Members carried by each of first and second housings are provided for permitting rotation of said first housing relative to second housing in second reversed direction, and including members for limiting the amount of pivoting of first housing in second direction such that pulley member continuously maintains optimum tension on the endless transmission member.

9 Claims, 3 Drawing Sheets

TENSIONING DEVICE FOR TIMING BELT OR CHAIN IN AUTOMOTIVE ENGINE APPLICATIONS

FIELD OF THE INVENTION

The present invention relates to belt or chain tensioning devices, and more particularly to spring-driven tensioning devices for the drive belt or chain of an internal combustion engine.

DESCRIPTION OF THE PRIOR ART

In the automotive engine industry, it has become the practice to use a single endless member, such as a belt or chain, to maintain synchronous operation of "primary" system engine components, e.g., crank shafts, camshafts, spark distributors, ignition and fuel injection devices, valves, and in some cases balance shafts. In typical engine applications, the single endless member is driven in motion by a pulley or sprocket gear connected to the engine crank shaft. The driven endless member, in turn, is coupled by appropriate means with a "secondary" system of engine components, such as the alternator, various pumps and accessory equipment.

A frequently encountered problem in using single endless belts as power transmission members involves maintaining contact between the belt and the belt-engaging members carried by the various primary and secondary components of the engine in order to provide a desired level of tensioning of the belt. Single endless belts used in this environment for this purpose are typically formed with a surface specifically adapted for engagement with the component carried, belt-engaging members. Typically, where the belt-engaging members are embodied as pulleys, the belt is provided with a smooth, flat surface, while where the belt-engaging members are embodied as sprocket wheels or gears, the belt is provided with ribbing or other similar surface protrusions. In either case, it is absolutely necessary to maintain contact between the belt and the belt-engaging members of the primary system components so that synchronous operation of the system can be sustained. In addition, it is desirable to maintain contact between the belt and the belt-engaging members of the secondary system components so that an optimum operating efficiency of the secondary components can be achieved.

Loss of contact between the belt and the belt-engaging member is evidenced in different ways, depending on the structure of the belt-engaging member. In the case of pulley-type belt-engaging members, loss of contact is manifested by slipping of the belt, which arises as a result of stretching of the belt or through a whipping condition caused by repeated, sudden, accelerations and decelerations of the belt. In the case of sprocket-type belt engaging members, loss of contact is manifested by the belt "jumping" from one tooth to another or slipping off any one of the teeth. In either case, the result is a diminishment of efficiency in the operation of the engine, and worse, the possibility of damage to the engine, the primary and secondary components, or the belt itself. Therefore, to minimize the possibility of occurrence of such damage and to ensure optimum operating efficiency for the engine and the driven primary and secondary components, it has become necessary to apply, through suitable mechanisms, an "optimum tension" to the single endless belt. As used above and hereinafter, "optimum tension" refers to the minimum tensioning force which can be applied to the belt while still being of sufficient amount to prevent slippage of the belt relative to the pulley or jumping of the belt off or over the teeth of a sprocket wheel or gear.

Numerous tension applying devices have been proposed to accomplish these purposes. One type of tensioner uses a bushing formed of an elastomeric material which is placed in compression by some mechanical means for continuously exerting a tensioning force on a belt. Tensioner constructions of this type, however, have the disadvantage that the high load rate which they exert on the belt results in a rapid loss of tensioning as the belt stretches, and the load rate limits the stroke of the belt-engaged idler pulley to a shorter distance than desired. Also, sudden acceleration and deceleration of the drive belt can cause a whipping action to occur which creates a time lag before full damping is achieved.

Other belt tensioning devices use coil springs which are either in compression or tension, for applying and maintaining the tensioning force on a belt-engaging pulley or sprocket. Devices of this kind, some of which employ the biasing force of a coil spring in combination with hydraulic-actuated members, regulate the amount of applied tensioning force, depending on whether the engine is running or shut off. These devices, however, have the disadvantage that the coil springs develop undesirable vibration harmonics, which when the engine is running, diminish the effectiveness of the devices as tensioners by causing periodically excessive tightening and loosening conditions.

Still other known tensioning devices and arrangements include biasing mechanisms in combination with some type of mechanical retaining means. For example, in U.S. Pat. No. 4,634,407 to Holtz, a ratchet and pawl retainer is employed to maintain a minimum amount of tensioning force on a belt, while in U.S. Pat. No. 4,392,840 to Radocaj, a one-way roller clutch permit movement of a tensioning device in a belt-tensioning direction when the belt extends, while preventing movement of the tensioner in a reversed, non-tensioning direction. The retaining mechanisms of these devices, however, have the drawback that the tensioning force on the endless drive belt can only be increased and no mechanism is provided for eliminating the undesirable effects of belt whipping.

Still other tensioner devices are known which address the problem of resonant forces which are experienced within the tensioner devices. Such resonant forces, which occur as varying loads and/or vibratory forces, typically arise as a result of cyclic loading and unloading of valve springs, or as a consequence of piston power strokes. One tensioner device (see U.S. Pat. No. 4,583,962 to Bytzek et al) purports to accommodate such undesirable internal resonant forces by incorporating a nylon sleeve between a fixed pivot member and a pulley-supporting member pivotally mounted on the pivot member. However, the sleeve of this tensioner is made of a material which has the approximate hardness of wood and functions only as a bearing sleeve, thereby providing primarily only sliding friction damping and substantially no solid damping. Thus, any forces or torques transmitted from the belt and engine to the pulley-supporting member which tend to move the pulley-supporting member in an orbiting manner about the pivot member are undamped, thereby resulting in the undesired internal resonant vibrations from which all other known tensioning devices suffer.

An additional problem, which has been recognized but not yet solved by the prior devices, involves the effects of temperature changes on tension in the belt. From engine start-up until engine shut-down, temperatures of, and in the vicinity of, the engine fluctuate to such an extent that temperature-dependent operational parameters (e.g., pulley or sprocket diameters, belt length, and relative positions of the components) of the belt drive system vary, resulting in increased tension in the belt.

Therefore, in order to accommodate the variance of such temperature-dependent operational parameters as well as belt stretching and whipping and the effects of resonant forces, while maintaining an optimum tension on the belt, it would be desirable to provide a mechanism capable of continuously self-adjusting, contemporaneously with operation of the engine, to vary the amount of tensioning force applied to the belt. Since adjustments of this kind are almost impossible, if not impractical, to make while the engine is operating, it would be desirable to provide a belt-tensioning device having an automatic mode of self-adjustment so that the changes in dimension and position of the components, which occur as the temperature of the engine changes and which alter the tensioning requirements for the belt, can be effected by the belt tensioning device itself, without human intervention.

OBJECTS OF THE INVENTION

It is therefore a principal object of the present invention to provide a tensioning device adapted for use with an endless power transmission member, such as a belt or a chain, which will overcome all the drawbacks and disadvantages of the prior tensioning devices and which further will enable the application of an optimum tensioning force to the endless power transmission member in all modes of engine use.

Another object of the present invention is to provide a belt tensioning apparatus capable of continuously maintaining a predetermined amount of tension on the drive belt of an engine, while automatically adjusting the amount of applied tension in response to thermally-induced component expansion and contraction.

Still another object of the present invention is to provide a belt-tensioning mechanism capable of movement in one direction for applying a tensioning force to an engine belt to eliminate slack and minimize belt whipping on engine start-up, and further capable of movement in another reversed direction for automatically adjusting the applied tensioning force during engine operation or on engine shut-down.

Still another object is to provide means, in a belt-tensioning device, for dampening harmonic vibrations imparted to the belt by various systems and devices attached to and driven by an engine.

Yet another object is to provide a belt-tensioning mechanism which is of simple construction, compact, and easily installable in its intended environment without the need for special tools.

These and other objects that may hereinafter become apparent are accomplished according to the invention by providing a belt-tensioning mechanism which is adapted for mounting adjacent an endless belt and for applying to the belt an optimum tensioning force. The belt-tensioning mechanism of the present invention includes a first pivot member defining a first pivot axis, a cylindrical housing arranged concentrically about the first pivot axis and having a radially extending arm supporting a rotatable belt-tensioning member at the free end thereof, a biasing means for driving the housing and the belt-tensioning member about the first pivot axis in a belt-tensioning direction, and a camming assembly coupled with the housing for enabling limited movement of the housing about the first pivot axis in the opposite, tension-diminishing direction.

Preferably, the belt-tensioning member is a pulley and bearing assembly, and the radially extending arm of the housing includes a second pivot member defining a second pivot axis which is laterally displaced from the first pivot axis and about which the pulley and bearing assembly is concentrically mounted.

The camming assembly includes a clutch engaged with the first pivot member, a cam housing mounted concentrically about the clutch, and a plurality of keys disposed about the exterior of the cam housing, and located within suitably configured slots provided in the interior of the cylindrical housing. The clutch is preferably of the type known as a one-way clutch, and functions to permit rotation only in the belt-tensioning direction. The cam housing is secured to the one-way clutch, and is capable of rotation, relative to the first pivot member, only in the belt-tensioning direction. Both the keys on the cam housing and the slots in the cylindrical housing extend in the direction of the first pivot axis. The slots are provided with a circumferential width larger than the circumferential width of the keys so as to permit a limited amount of free rotation of the cylindrical housing relative to the clutch housing before the keys and slots become locked.

When the tension in the belt increases, the pulley-supporting cylindrical housing is urged by the belt to rotate about the first pivot member in the opposite, tension-diminishing direction. In turn, while the one-way clutch prevents reverse rotation of the clutch housing, the pulley supporting, cylindrical housing is permitted to move a limited amount in the reversed, tension-diminishing direction by virtue of the excessive width of the slots relative to the width of the keys. When the cylindrical housing has moved in the reverse direction a distance equal to the excessive width of the slots, the keys and slots engage positively, and further reversed rotation of the belt-tensioning apparatus is prevented.

BRIEF DESCRIPTION OF THE DRAWINGS

These and other objects, features and advantages of the present invention will be more fully appreciated from the following detailed description when considered in connection with the accompanying drawings, in which the same or like reference numerals designate the same or corresponding parts throughout, and in which.

DETAILED DESCRIPTION OF THE INVENTION

Figure 1:
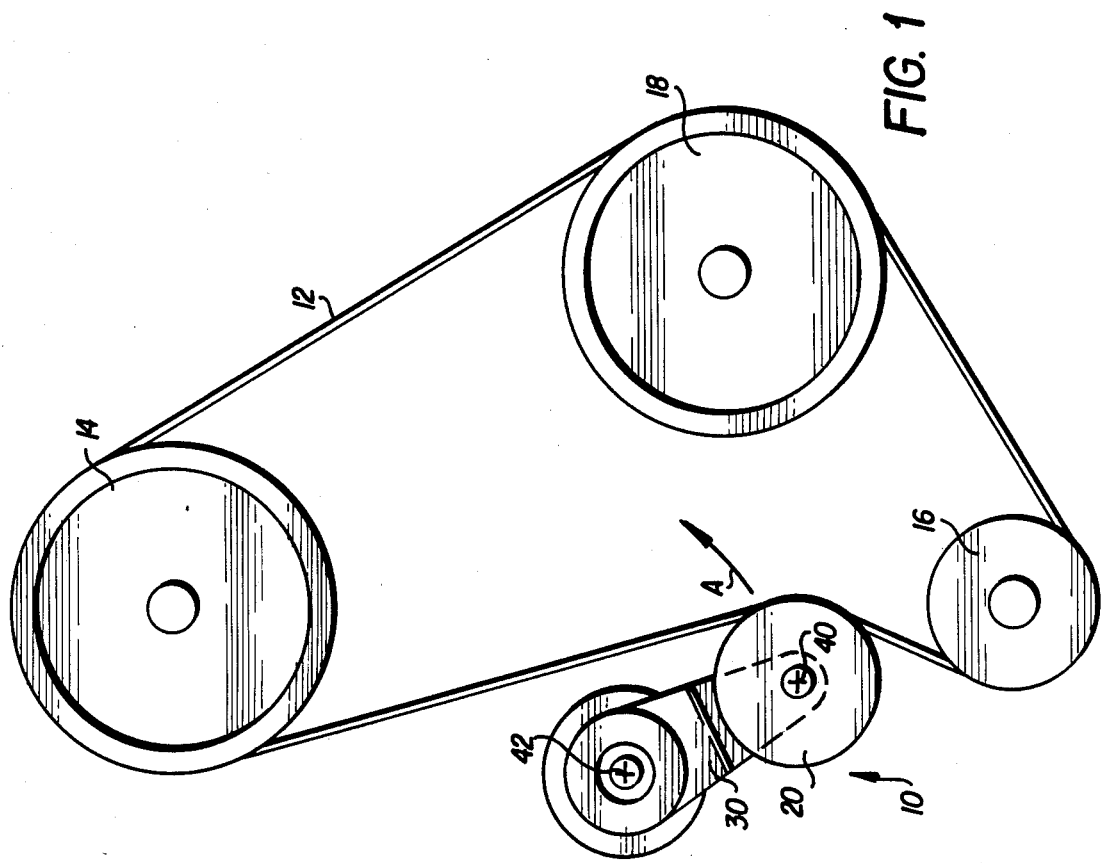
FIG. 1 is a diagrammatic view looking toward the side of an engine and illustrating an endless drive belt operatively connected to and driving various engine components, with the belt tensioning apparatus of the present invention engaged with the belt and applying an optimum belt-tensioning force.

The tensioning device 10 of the present invention is illustrated schematically in FIG. 1 of the drawings. Typically, the tensioning device 10 is mounted on the side of an engine and is disposed in tensioning engagement with an endless flexible member 12 of a power transmitting drive system. For purposes of the following detailed description of this invention, the flexible member 12 is considered to be a flexible belt and the tensioning device 10 is considered to include a belt engaging pulley. However, it is to be understood that the flexible member 12 could be either a belt or a chain, and the tensioning device 10 could include either a belt-engaging pulley or sprocket, or a chain-engaging sprocket.

The drive system illustrated in FIG. 1 typically consists of a plurality of belt pulleys or sheaves having configurations and diameters determined by the particular engine components with which they are associated as well as their locations relative to one another. The pulleys illustrated are supported on the shafts of their respected engine components, which in turn are mounted on an engine (not shown) in a usual manner known in the art. Belt 12 preferably is operated in a single vertical plane to eliminate binding and skewing of the belt.

The belt drive system illustrated in FIG. 1 includes the belt 12, a main driving pulley 16 operatively coupling the output of the main drive or crank shaft of the engine to the belt 12, a pulley 18 operatively coupling the belt 12 to an accessory drive shaft, and a pulley 14 operatively coupling the belt 12 to a camshaft. The tensioning device 10 is shown to be positioned between the main driving pulley 16 and the camshaft pulley 14, but it is to be understood that the position of tensioning device 10 can be varied depending upon engine size and/or component location.

As shown in FIG. 1, the tensioning device 10 includes a belt-engaging pulley 20 carried by an arm 30. The pulley is mounted on a distant end of arm 30 for free rotation about a first axis 40, and is urged into tensioning engagement with the belt 12 by the pivoting of the tensioning device 10 and its arm 30 (in a counterclockwise direction A as shown in FIG. 1) about a second axis 42 which is offset from the first axis 40.

Figure 3:
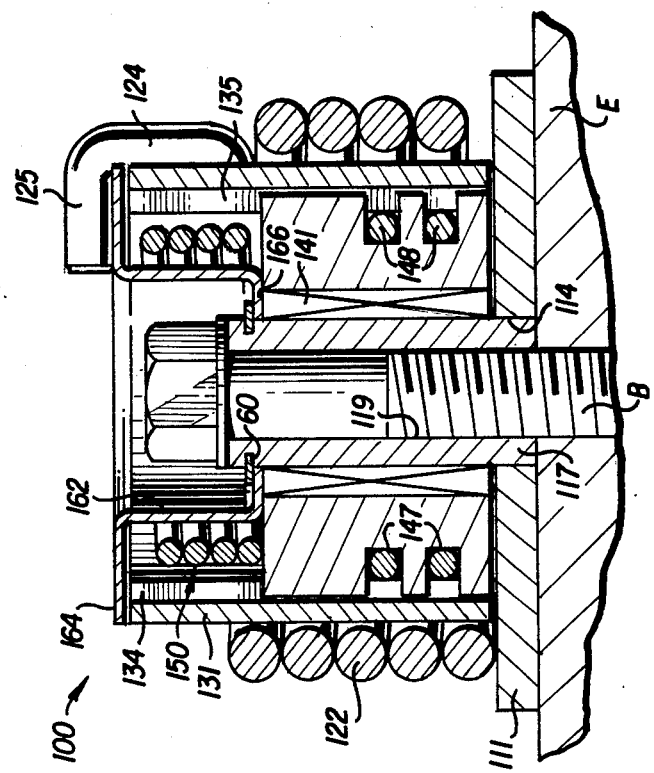
FIG. 3 is a cross-sectional view taken along section lines 3—3 of the tensioner apparatus shown in FIG. 2, and illustrates the tensioner assembly.
Figure 2:
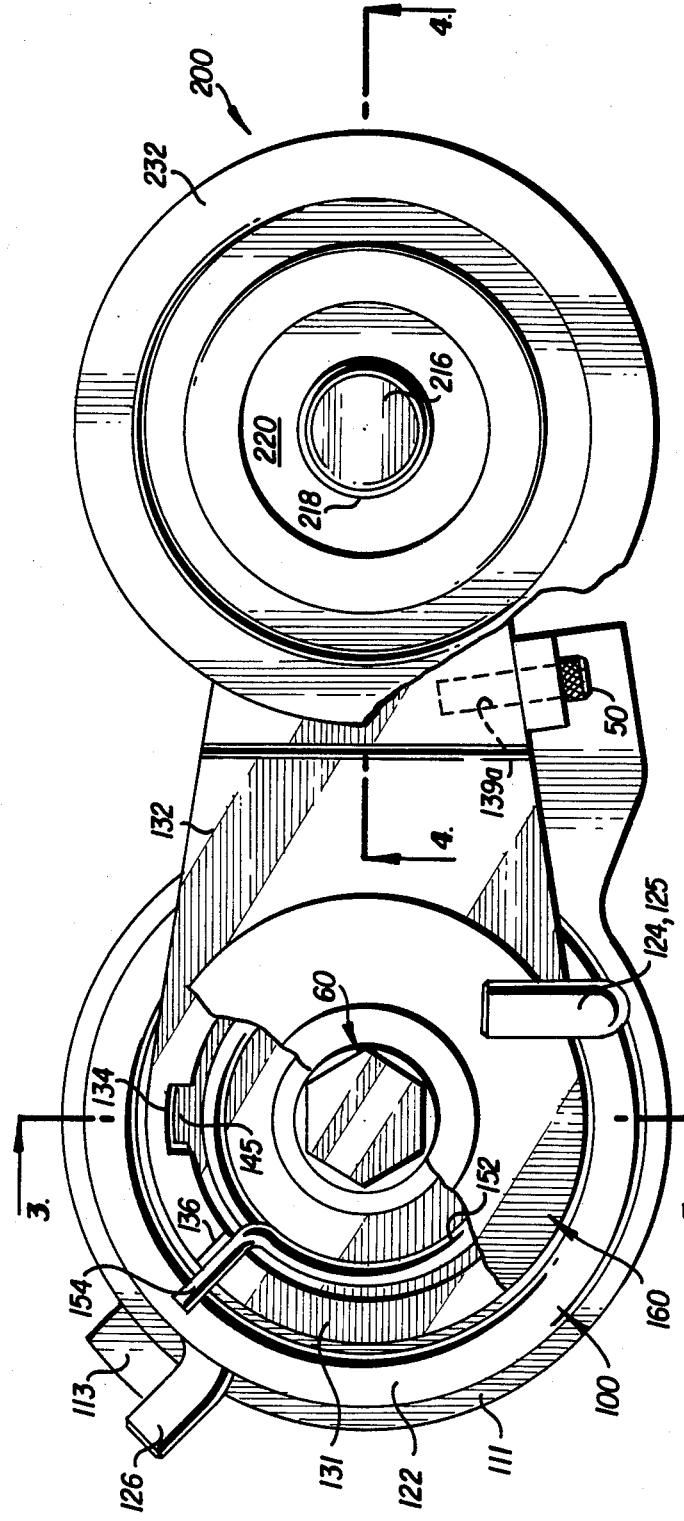
FIG. 2 is a top plan view, partially broken away, of the installed tensioner apparatus of the present invention illustrating the tensioner assembly and the pulley assembly.
Figure 4:
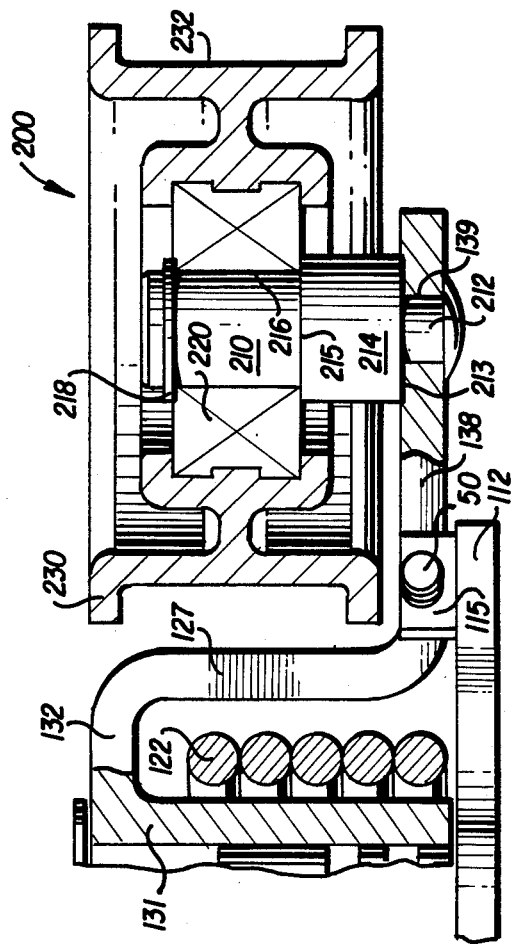
FIG. 4 is a cross-sectional view taken along section lines 4—4 of the tensioner apparatus shown in FIG. 2, and illustrates the pulley assembly and the supporting pivot arm.
Figure 5:
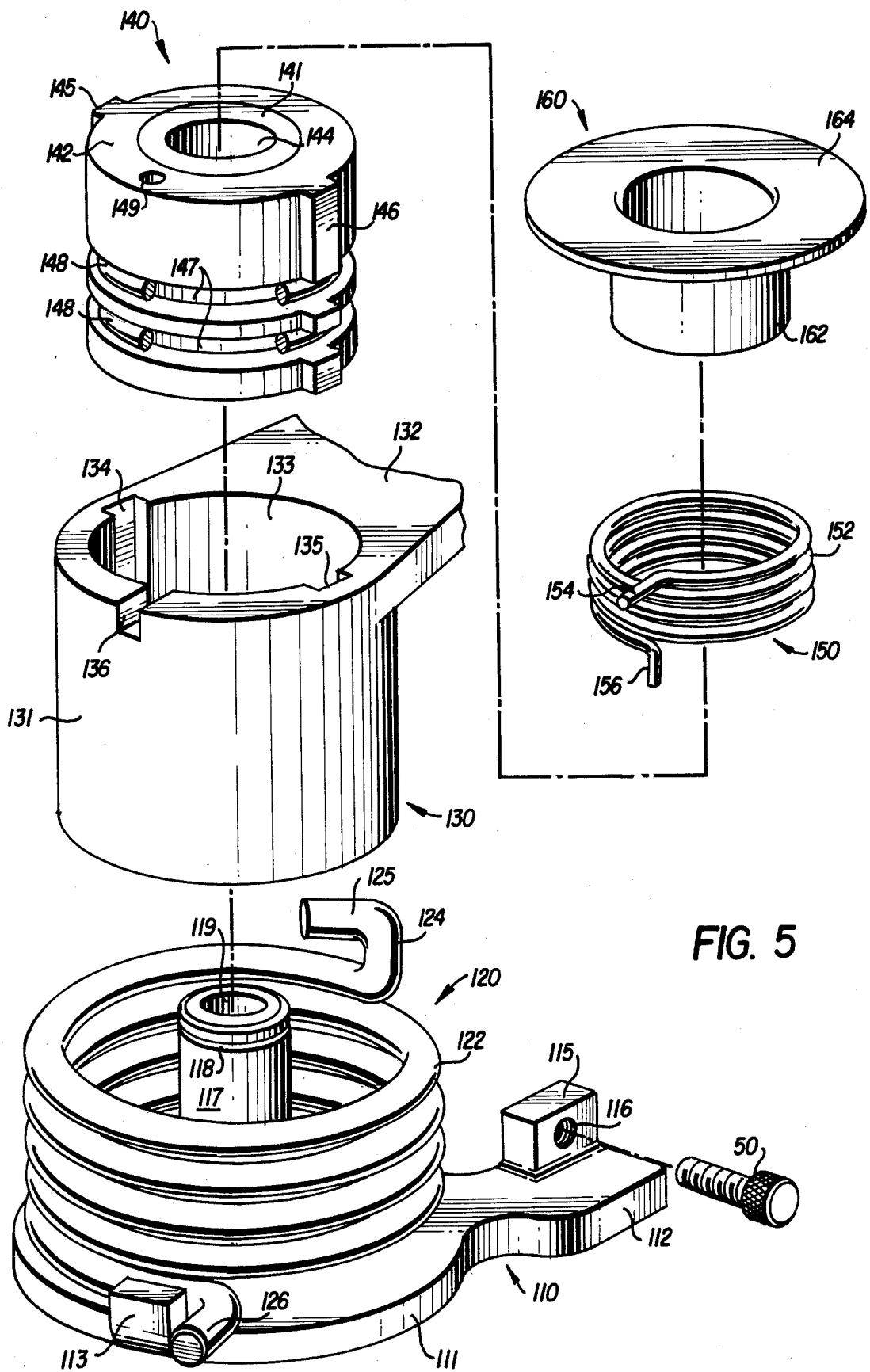
FIG. 5 is an exploded perspective view of the principal components of the tensioner assembly.

The belt tensioner apparatus 10 of the present invention comprises a tensioner assembly 100 shown principally in FIGS. 2, 3 and 5, and a pulley assembly 200 shown principally in FIGS. 2 and 4.

Referring now to the drawings in detail, and in particular to FIG. 5, the tensioner assembly 100 is shown to include a pivot base assembly 110, a primary torsion spring 120, a pivot housing 130, a clutch assembly 140, a secondary torsion spring 150 and a cover 160.

The pivot base assembly 110 includes a planar plate member having a base portion 111 and an extension portion 112. The base portion 111 is illustrated as having a circular periphery, but it is understood that the base portion may have any other suitable peripheral configuration. An upstanding tab 113, formed at the periphery of the base portion 111 at a suitable location, is provided for securing one (the lower) end of torsion spring 120. However, it is also possible to secure that end of spring 120 in an aperture or slot provided at a suitable location in the base portion 111, or in any other conventional manner considered to be within the level of skill of the ordinary artisan in this art. A circular opening 114 (see FIG. 3) is formed in the central region of the base portion for securing a pivot shaft 117 (described below). The extension portion 112 is formed as a short arm member extending outwardly from the periphery of the base portion 111, preferably at a location remote from the upstanding tab 113. A second upstanding tab 115 is provided at the free end of the extension portion 112, and a through bore 116 extends through tab 115 for receipt of a threaded bolt 50 (the purpose of which will be described below). The pivot shaft 117 has its lower end disposed in the opening 114 of the base portion 111, and extends substantially normal to, and away from, the base portion with an annular groove 118 being provided adjacent the free upper end of the pivot shaft. The pivot shaft 117 comprises an annular cylindrical body having a central bore 119 for receipt of a mounting bolt (shown generally at 60 in FIGS. 2 and 3), and preferably is secured to the base portion 111 in any conventional manner, as for example by means of a friction press fit, a key and slot fit, or by a weld, so that relative rotation between the pivot shaft and the base portion is prevented. Alternatively the base portion 111 and the pivot shaft 117 may be formed as a single unitary element.

The primary torsion spring 120 is a helical coil spring having a coil body 122, a first, upper end 124 and a second, lower end 126. The body of the coil spring is preferably provided with an exterior diameter which is wholly contained within the external periphery of the base portion 111. When seated on the base portion, the coil spring body 122 is disposed substantially concentrically with the pivot shaft 117. Spring end 124 is formed with the free end portion 125 being turned over, and directed inwardly of, the coil body 122, and preferably as a U-shaped hook. Spring end 126 is formed as a substantially radially outwardly directed portion adapted for engagement behind one side of the tab 113. It is to be understood that the spring ends 124, 126 may be provided with any shape or formed in any configuration as long as the intended functions can be achieved. The primary torsion spring 120 is employed to pivotally urge the pivot housing 130 about the pivot axis 42 defined by the pivot shaft 117 (i.e., in a counterclockwise direction as seen in FIG. 1) so that the desired optimum tensioning force can be applied by the pulley 20 to the belt 12.

Pivot housing 130 includes a cylindrical portion 131, and an extension portion 132 (described in greater detail below). The cylindrical portion 131 is provided with a longitudinally extensive central bore 133. The annular wall of cylindrical portion 131 has an external diameter which is smaller than the internal diameter of the coil body 122 of primary torsion spring 120 so that the cylindrical portion 131 can be mounted on the base portion 111 of the pivot base assembly 110 concentrically within the torsion spring 120. As best seen in FIG. 5, keyways or slots 134, 135 are provided in the internal surface of the bore 133 of the cylindrical portion 131. The keyways or slots have an axial orientation, are preferably at least two in number, and have been illustrated as being disposed 180° apart. It is to be understood, however, that the keyways need only extend axially a distance sufficient to accept the keys on the clutch assembly 140, that any number of keyways or slots may be provided, and that, in the event the number of keyways is greater than 1, the spacing between the keyways or slots may be chosen in any suitable manner. The keyways or slots 134, 135, as shown in the drawings, extend from the top surface of cylindrical portion 131 downwardly to the bottom surface (see FIG. 3). A notch 136 is provided in the annular wall of the cylindrical portion 131. The notch 136 extends downwardly from the top surface of the cylindrical portion and communicates with the inner annular surface as well as the outer annular surface. In the preferred embodiment illustrated in the drawings, the notch is disposed midway between the keyways 134, 135, and is located substantially opposite the planar second portion 132. It is to be understood, however, that the notch 136 can be disposed at any location about the circumference of the cylindrical portion as long as it does not interfere with the operative use of the keyways. The extension portion 132 of the pivot housing 130 extends laterally from the top surface of the cylindrical portion 131 and, as more clearly shown in FIGS. 3 and 4, includes a substantially vertical leg 137 and a substantially horizontal leg 138. The horizontal leg 138 is disposed adjacent the tab 115 and provides a cantilevered support for the pulley assembly 200. Preferably, the horizontal leg 138 extends from the lower end of the vertical leg 137 in the same lateral direction as the extension portion 132. A through bore 139 is provided in the horizontal leg 138 at a region remote from the interconnection of the vertical and horizontal legs. The bore 139 is provided for receiving one end 212 of a support stud or shaft 210 of the pulley assembly 200 (see FIG. 4). The end 212 of support shaft 210, after insertion into bore 139, is swaged into secure engagement with the horizontal leg 138. It is to be understood that other methods of connection may be employed, as for example, by welding, threading, etc. In addition, it is contemplated that the shaft 210 could be formed with the horizontal leg 138 as a single unitary element. Horizontal leg 138 also includes a threaded bore 139a, located proximate the vertical leg 137 (see FIG. 2), for receiving the threaded bolt 50 in order to secure the pulley assembly 200 to the tensioner assembly 100 prior to operation of the tensioning device and/or prior to installation.

Clutch assembly 140 includes a conventional one-way clutch 141 and a clutch housing 142. The one-way clutch 141 is disposed within a central bore of, and tightly secured to, the clutch housing 142. The attachment of the one-way clutch 141 to the clutch housing 142 can be effected in any suitable manner, as for example by a press or friction fit. The invention also contemplates forming the one-way clutch and the clutch housing as a single unitary part. The one-way clutch 141 comprises an annular housing having a central annular bore adapted to receive the pivot shaft 117 and an outer annular surface adapted to be tightly fitted within (e.g., by press fit) the clutch housing 142. The one-way clutch 141 is constructed so that relative rotation between the pivot shaft and the clutch is permitted in one direction only, i.e., in a counterclockwise direction as seen in FIG. 1. The exterior of the clutch housing 142 is provided with at least one key (the embodiment shown in the drawings is depicted as having two longitudinally extending keys 145, 146). Preferably the number of keys corresponds in number to the number of keyways provided in the pivot housing. However, it is understood that it is only necessary to have at least as many keyways as there are keys. Further, it is to be understood that the location of the keys and keyways may be reversed from the manner shown in the drawings such that the keyways are located on the clutch housing and the keys are located on the pivot housing. The exterior of the clutch housing 142 is also provided with a plurality of annular grooves 147, 147 in which annular, elastomeric friction elements 148, 148 are disposed. An eccentrically placed opening 149 having a predetermined depth is formed in the clutch housing 142 and extends from the top surface thereof downwardly.

The secondary torsion spring 150 is a helical coil spring which includes a coil body 152, a first end 154 which is adapted to seat in the notch 136 provided in the cylindrical portion of the pivot housing, and a second end 156 which is adapted to engage in the opening 149 provided in the top surface of the clutch housing.

The spring constants of the primary and secondary torsion springs 120 and 150 are chosen as a function of the material and thermal properties of the various pulleys, the belt, and the engine and components, as well as the range of temperatures to which such components will be subjected during operation of the engine and the desired optimum belt tension to be achieved.

The cover 160 is an annular element having a cylindrical body portion 162 and a circumferentially extending wide flange portion 164 at the upper end of the body portion. The cover 160 is employed to retain the secondary torsion spring 150 and clutch housing 140 within the cylindrical portion 131 of the pivot housing 130.

Referring now to FIG. 4, the pulley assembly 200 and the manner in which it is supported on the horizontal leg 138 of the extension portion 132 of the pivot housing 130. Pulley assembly 200 includes a vertically oriented bearing support shaft 210 which is secured adjacent the free end of the horizontal leg 138 by a fastening member 212 which passes upwardly through the bore 139 and engages within a central bore (not shown) in the lower region of the bearing support shaft 210. The shaft 210 includes a first, lower annular portion 214, and a second annular portion 216 spaced axially from the first annular portion. The first annular portion 214 is of greater diameter than the second annular portion 216, and has an upper surface 215 on which the bearing assembly 220 of pulley 230 is supported, and a lower surface 213 which is seated securely against the upper surface of the horizontal leg 138. A fastener 218 (e.g., a circlip) engages the upper end of the second annular portion 216 (e.g., in an annular groove) to hold the bearing assembly 220 in place on the second annular portion 216, and against the surface 215, of the support shaft. The bearing assembly 220 and the pulley 230 are of conventional construction with the pulley 230 having a circumferential, outer surface 232 for engaging with the belt 12. When the pulley assembly is mounted on the support shaft 210, the pulley is capable of rotating freely about the support shaft via the bearing assembly.

FIG. 3 shows the tensioner assembly 100 bolted to the engine E by a threaded bolt or similar fastener B which extends through the central bore 119 of pivot shaft 117. The one-way clutch 141 of clutch assembly 140 is mounted for free rotation on the exterior of pivot shaft 117, and the clutch housing 142, which is secured to the one-way clutch 141, is disposed within the cylindrical portion 131 of the pivot housing 130. The annular inner surface of the central bore in the one-way clutch 141, when mounted on the pivot shaft 117, is placed in friction fitted engagement with the annular external surface of the pivot shaft 117. The clutch housing 142 is positioned in the pivot housing 130 such that keys 145, 146 of the clutch housing are disposed in the keyways 134, 135 of the pivot housing. One or more annular friction elements 148 are positioned in a corresponding number of annular grooves 147 of clutch housing 142, and are held in a state of slight compression between the inner wall of the cylindrical portion 131 of pivot housing 130 and the radially inner side of the annular grooves. Although depicted with circular cross-section in the drawings, the friction elements may have any cross-section chosen to produce the desired dampening effect. The primary torsion spring 120 is mounted about the cylindrical portion 131 of the pivot housing 130 such that the coil body is positioned concentrically with pivot shaft 117. By appropriate means (e.g., the lug 113 shown in FIG. 2), the lower end 126 of the primary torsion spring 120 is attached to the base portion 111 of the pivot base assembly 110, and the upper end 124 of the primary torsion spring 120 is attached to the pivot housing 130 (FIG. 2 illustrates a hooking engagement of the free end portion 125 over the extension portion 132). The secondary torsion spring 150 is mounted concentrically with the pivot shaft 117 atop the clutch housing 142, and interiorly of the pivot housing 130. The first end 154 of the secondary torsion spring is engaged within the notch 136 in the upper region of the pivot housing cylindrical portion 131, and the second end 156 secured within the eccentric opening 149 in the clutch housing 142. The lower annular flange 162 of the cover 160 is positioned concentrically about the upper end of the pivot shaft 117, and concentrically within the body 152 of the secondary torsion spring 150. The lower end of flange 162 is provided with a radially inwardly directed rim 166 which is held in secure engagement with the upper surface of clutch assembly 140 by the annular snap fastener 60 (e.g., a circlip or other similar annular resilient, or snap-type fastener). The fastener 60 is engaged in the annular groove 118 at the end of pivot shaft 117, and maintains the upper annular flange 164 in overlying relationship with the upper surface of the cylindrical portion 131 of the pivot housing, while simultaneously holding the annular neck portion 162 concentrically about the pivot shaft and radially within both the secondary torsion spring 150 and the cylindrical portion 131 of the pivot housing.

Rotation of the pivot housing 130 relative to the pivot shaft 117 is prevented upon assembly, during intransit shipment and installation, and prior to operation of the tensioning apparatus, by the threaded engagement of bolt 50 with horizontal leg 138. When the tensioning assembly is attached to the engine in the desired location, it is secured to the engine E by threaded bolt B which is passed through the central bore 119 in the pivot shaft 117 and threaded into a corresponding bore in the engine block. Once the tensioning apparatus is secured to the engine, the bolt 50 is removed and discarded, and tensioning of the belt 12 begins. The primary torsion spring 120 drives pivot housing 130 in rotation about pivot shaft 117 (counterclockwise as seen in FIG. 1) and thus the pulley 230 of pulley assembly 200 is moved into tensioning engagement with the belt 12. At the same time, the clutch housing 142 and one-way clutch 141 of the clutch assembly 140 also are caused to rotate about pivot shaft 117 in the belt-tensioning direction.

As indicated above, the one-way clutch 141 is capable of rotation about pivot shaft 117 in one direction only, i.e., in the belt-tensioning direction, and insofar as the clutch housing is non-rotatably fixed to the one-way clutch 141, neither the clutch housing nor the one-way clutch will permit rotation in the reversed, belt-untensioning, direction of the pivot housing 130. However, a controllable amount of reverse rotation of the pivot housing 130 is desirable in order to accommodate various conditions related to engine operation.

For example, as the engine warms to operating temperature, the centerline distances between the camshaft, the crankshaft and the belt tensioning pulley 230 increase due to thermal expansion of the engine. In addition, the diameter of each belt engaging pulley or sprocket increases with corresponding increases in engine operating temperature. The combined effect of such thermally-produced expansions is the application, by the belt 12, of a force to the belt-tensioning pulley 230 in the belt-untensioning direction (i.e., in the direction opposite to that indicated by the arrow A shown in FIG. 1). Movement of the belt-tensioning pulley in the belt-untensioning direction, made possible by the controlled reverse rotation adjusting mechanism of the present invention, permits a reduction in the tension which initially was applied to the belt 12, or at the very least, the maintenance of a predetermined optimum tension.

More particularly, when the belt-tensioning apparatus 10 of the present invention is pivoted into belt-tightening engagement with the belt 12 (counterclockwise in FIG. 1), the one-way clutch 141 facilitates pivotal movement of the clutch housing 142 about the pivot shaft 117. As can be seen most clearly in FIGS. 2 and 5, the clutch housing 142 is loosely interconnected with the pivot housing 130, by virtue of the keys 145, 146 on the clutch housing and the keyways 134, 135 on the pivot housing. By virtue of this interconnection, when the pivot housing 130 is driven in rotation about the pivot shaft 117 by primary torsion spring 120 to place pulley 210 in belt-tensioning engagement with belt 12. The clutch housing 142 is likewise caused to rotate about the pivot shaft 117.

On the other hand, when the belt-tensioning apparatus 10 is pivotally urged in a belt-untensioning (clockwise) direction about the pivot shaft 117, by interaction of the belt 12 with the pulley 210, reverse rotation of the pivot housing 130 in the belt-untensioning direction is permitted by the degree of movement of the keys 145, 146 on clutch housing 142 within the keyways 134, 135 in pivot housing 130. The amount of reverse rotation of the pivot housing 130 relative to the pivot shaft 117 is controllable by making an appropriate choice of the circumferential extent of keyways 134, 135 and the keys 145, 146, so that an appropriate amount of relative movement between the keyways and the keys is permitted. Such relative movement is determined as a function of the thermal expansion characteristics of the particular engine to which the tensioning device 10 is to be applied, as well as the elasticity and thermal properties of the belt 12 which will be used.

When belt tensioning takes place, prior to starting the engine and afterwards while the engine is operating, harmonic vibrations of the engine also tend to urge pulley 210 to rotate about the pivot shaft 117 in the belt-untensioning direction. Such harmonic vibrations, which may result from cyclic loading and unloading of valve springs as well as by crankshaft power strokes, are damped out by the elastomeric friction elements 148, 148 disposed in the recesses 147, 147 of the clutch housing 141.

By means of present invention, relatively constant frictional dampening throughout the life of the belt, and the operating range of the tensioner, can be achieved, regardless of the type, frequency, and magnitude of the loads imparted to the tensioner. Although the dampening provided is essentially constant, its magnitude can be easily changed to accommodate various belt geometries and engine requirements, e.g., by changing hardness, squeeze, cross section, or surface finish (metal and elastomeric element). A change in the coefficient of friction can also be accomplished by the addition of internal lubricants to the elastomeric element, or by changing material. A material change would still fall within the classification of elastomeric materials as described in ANSI/ASTM specification D2000-77a, SAE designation J200.

It is realized and understood that some compression set is inherent in elastomeric materials. However, with the present invention, the amount of compression set is compensated in the initial gland design. The amount of compression set varies with different materials; however, it can easily be quantified through recognized ASTM test procedures.

The compression set generally occurs during the first few hours of operation at engine temperatures. The synchronous drive belt also undergoes a "seating" routine during the first few hours of operation, in which the tooth profiles seat in the pulleys. Also in the first few hours the belt initially stretches, after which it stretches very little throughout its service life. The higher resisting torque of the elastomeric element before compression set, compared to its lower torque afterward, aids in maintaining a constant belt tension.

Current art requires that the initial installation tension be set at a value that is higher than optimum, in anticipation of this initial stretch. The dampening method used in the present invention minimizes, if not eliminates, this undesirable condition. After the compression set occurs, the magnitude of the dampening remains essentially constant throughout the thermal expansions and contractions of the engine, and the service life of the belt.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. Apparatus for maintaining a predetermined optimum tension on an endless power transmission member, comprising:
   a first cylindrical housing including a radially extending arm member,
   pulley means carried by said arm member at an end thereof remote from said first housing,
   pivot means for said first housing, said pivot means defining a pivot axis, and including a second cylindrical housing and one-way clutch means permitting pivoting of said second housing in one direction only, said second housing being disposed within said first housing,
   means, coupled between said pivot means and said first housing, for rotatably driving said first housing about said pivot means in a first direction to move said pulley means into tensioning engagement with said endless power transmission member,
   interfitting radially extending means, carried by each of said first and second housings, for permitting rotation of said first housing relative to said second housing in second reversed direction, each of said interfitting radially extending means including means for limiting the amount of pivoting of said first housing in said second direction such that said pulley means continuously maintains said optimum tension on said endless transmission member.

2. The apparatus of claim 1, wherein said interfitting radially extending means comprise key means on said second cylindrical housing and slot means on said first cylindrical housing, said slot means and key means each having a circumferential extent, the circumferential extent of said slot means being substantially greater than the circumferential extent of said key means.

3. The apparatus of claim 2, wherein said slot means and said key means extend along facing surfaces of said first and second housings in directions parallel to one another.

4. The apparatus of claim 3, wherein said key means comprise a plurality of keys and said slot means comprise a plurality of slots.

5. The apparatus of claim 1, wherein one of said first and second cylindrical housings carries elastomeric dampening means engageable with at least a portion of the interior surface of the other of said cylindrical housings, said elastomeric dampening means acting to minimize harmonic vibrations imparted to said cylindrical housings by said endless power transmission members.

6. The apparatus of claim 5, wherein said elastomeric dampening means comprise annular friction elements, and said one of said cylindrical housings includes annular grooves in which said annular friction elements are seated.

7. The apparatus of claim 1, wherein
   a base plate
   said pivot means further includes securable to a support surface adjacent the endless power transmission member, and a hollow shaft member located substantially centrally of, and disposed substantially normal to, the base plate with one end of the shaft member being secured to the base plate,
   said one way clutch means includes an inner annular surface secured to the exterior surface of said shaft member, and
   said driving means comprising a helical coil spring having a first end secured to said base plate and a second end attached to the arm member of said first housing, said helical coil spring further having a coil body which is disposed exteriorly of said first cylindrical housing and concentric with said shaft members.

8. The apparatus of claim 7, and further including biasing means coupled between said first and second housings, wherein
   said driving means is loaded with a spring force which decreases as said first housing moves in said first direction of rotation, and
   said biasing means is loaded with a spring force which decreases as said first housing moves in said second direction of rotation, said biasing means acting to maintain said radially extending means carried by said first and second housings in relative position such that said pulley means continuously maintains said optimum tension on said endless power transmission member.

9. A belt tensioning device for maintaining a predetermined optimum tension on an engine timing belt, comprising:

pivot base means including a first cylindrical member attached to an engine adjacent said belt and defining an axis of rotation, said pivot base means further including one-way roller clutch means having an inner annular member secured concentrically about said first cylindrical member and an outer annular member rotatable about said axis of rotation in a first direction of rotation only, a second cylindrical member supported by said pivot base means and having an inner annular surface secured about the exterior of said outer annular member, said second cylindrical member having an outer annular surface, first key means extending radially from said outer annular surface, and annular groove means extending radially inwardly from in said outer annular surface, a third cylindrical member supported by said pivot base means and having an inner annular surface and an outer annular surface, said third cylindrical member being disposed concentrically about said second cylindrical member and including second key means extending radially from said inner annular surface, said third cylindrical member including an arm member extending laterally away from said axis of rotation and supporting at the distal end thereof pulley means for applying a tensioning force to said engine timing belt, said inner annular surface of said third cylindrical member being positioned sufficiently close to said outer annular surface of said second cylindrical member so that said key means of said first and second cylindrical members engage with one another when said third cylindrical member rotates, about said axis of rotation and relative to said second cylindrical member, between a first position in which said pulley means applies a maximum tensioning force to said timing belt and a second position in which said pulley applies a minimum tensioning force to said timing belt, biasing means for driving said third cylindrical member in rotation about said axis of rotation from said second position to said first position, and elastomeric damping means disposed in said annular groove means and resiliently engaging with said inner annular surface of said third cylindrical member to dampen vibrational forces imparted to said third cylindrical member by said timing belt.

* * * * *

UNITED STATES PATENT AND TRADEMARK OFFICE
CERTIFICATE OF CORRECTION

PATENT NO. : 4,822,322
DATED : April 18, 1989
INVENTOR(S) : KELLY D. MARTIN

It is certified that error appears in the above-identified patent and that said Letters Patent is hereby corrected as shown below:

IN THE CLAIMS:

Claim 7, line 2, delete;
line 3, after "includes" insert --a base plate--.

Signed and Sealed this

Fifth Day of September, 1989

Attest:

DONALD J. QUIGG

Attesting Officer

Commissioner of Patents and Trademarks